(12) United States Patent
Miyajima et al.

(10) Patent No.: US 11,506,583 B2
(45) Date of Patent: Nov. 22, 2022

(54) TEST METHOD FOR CHARACTERIZING MECHANICAL PROPERTIES

(71) Applicant: NATIONAL INSTITUTE OF ADVANCED INDUSTRIAL SCIENCE AND TECHNOLOGY, Tokyo (JP)

(72) Inventors: Tatsuya Miyajima, Aichi (JP); Mototsugu Sakai, Ibaraki (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 349 days.

(21) Appl. No.: 16/763,637

(22) PCT Filed: Nov. 15, 2018

(86) PCT No.: PCT/JP2018/042343
§ 371 (c)(1),
(2) Date: May 13, 2020

(87) PCT Pub. No.: WO2019/098293
PCT Pub. Date: May 23, 2019

(65) Prior Publication Data
US 2020/0284708 A1    Sep. 10, 2020

(30) Foreign Application Priority Data
Nov. 15, 2017 (JP) .............................. JP2017-219816

(51) Int. Cl.
*G01N 3/08* (2006.01)
*G01N 3/02* (2006.01)
*G01N 3/42* (2006.01)

(52) U.S. Cl.
CPC ................ *G01N 3/08* (2013.01); *G01N 3/02* (2013.01); *G01N 3/42* (2013.01);
(Continued)

(58) Field of Classification Search
CPC .. G01N 3/08; G01N 3/02; G01N 3/42; G01N 2203/0075; G01N 2203/0094;
(Continued)

(56) References Cited

U.S. PATENT DOCUMENTS

| 3,182,252 A | 5/1965 | Van Den Berg |
| 2019/0145878 A1* | 5/2019 | Coudert .................... G01N 3/46 73/81 |

FOREIGN PATENT DOCUMENTS

| CN | 205483873 | 8/2016 |
| JP | 2005-195357 | 7/2005 |

(Continued)

OTHER PUBLICATIONS

International SearchReport (ISR) dated Feb. 5, 2019 in International (PCT) Application No. PCT/JP2018/042343.

*Primary Examiner* — Jonathan M Dunlap
(74) *Attorney, Agent, or Firm* — Wenderoth, Lind & Ponack, LLP

(57) ABSTRACT

A test method for characterizing the mechanical properties including the surface adhesion energy γ on the basis of the experimentally derived P-A relationship,
where P means the indentation load under the penetration depth h of an indenter pressed onto a test specimen with surface adhesion, and
A means the contact area of indentation at the contact radius a under the applied load of P.
This test method enables the implementation for quantitatively as well as simultaneously characterizing the adhesion (Continued)

energy as well as the various mechanical properties (elastic/elastoplastic/viscoelastic properties) of soft materials.

2 Claims, 11 Drawing Sheets

(52) U.S. Cl.
CPC ............... *G01N 2203/0003* (2013.01); *G01N 2203/0019* (2013.01); *G01N 2203/0078* (2013.01); *G01N 2203/0094* (2013.01)

(58) Field of Classification Search
CPC ... G01N 2203/0078; G01N 2203/0019; G01N 2203/0003
See application file for complete search history.

(56) References Cited

FOREIGN PATENT DOCUMENTS

| | | |
|---|---|---|
| JP | 2015-175666 | 10/2015 |
| JP | 2016-206094 | 12/2016 |
| JP | 2017-146294 | 8/2017 |
| WO | 2016/194985 | 12/2016 |

* cited by examiner

TEST METHOD FOR CHARACTERIZING MECHANICAL PROPERTIES

TECHNICAL FIELD

The present invention is related to the indentation test methods for characterizing the various types of mechanical properties as well as the surface adhesion energy of elastic/elastoplastic/viscoelastic materials.

BACKGROUND OF THE ART

The conventional indentation test is a testing technique that evaluates various mechanical properties such as the hardness and the elastic modulus through measuring the size of residual impression that formed by pressing an indenter onto a surface of test specimen.

When an indenter is pressed onto the surface of a perfectly elastic body, its elastic modulus can be evaluated from the indentation-induced elastic deformation, while due to the plastic flow in elastoplastic indentation contact, the residual contact impression is formed after unloading. The size of this residual impression combined with the indentation load leads to the contact hardness. The elastic modulus and the contact hardness are the representative examples of several mechanical characteristics that are determined in indentation testing.

In ductile metals, the size of residual impression nearly coincides with the impression formed at the maximum indentation load due to the significant plastic flow. In ceramics and/or organic polymers with their significant elastoplastic and/or viscoelastic deformation and flow, on the other hand, their residual impressions after unloading are always smaller than those formed at the maximum indentation load due to the elastic recovery of impression induced in its unloading process.

Therefore, in order to quantitatively characterize the mechanical properties of a test specimen, it is necessary to make in-situ measurements of indentation contact, including the measurements of indentation load and penetration depth along with the indentation-induced contact area both in the loading and in the subsequent unloading processes.

In the conventional instrumented nanoindentation test method, it is only capable of measuring the penetration depth (h) under the applied indentation load (P). Outside the indentation contact area, the free-surface of an elastic body always sinks-in, while it piles-up for elastoplastic body. Without the information on these sink-in/pile-up contact profiles, therefore, it is by no means capable of conducting the quantitative characterization of mechanical properties of the test specimen indented. In order to circumvent this fatal issue of sink-in/pile-up contact profiles, undesirable approximations and assumptions have always been made in the conventional instrumented nanoindentation testing to estimate the indentation contact area (A) formed under the applied load (P). In other words, without the information on the indentation contact area A under the applied load P, no one determines in a quantitative manner the mechanical characteristics of any engineering materials.

The instrumented indentation microscope is the test system to overcome the difficulties included in the conventional instrumented nanoindentation test. The instrumented indentation microscope is capable of not only measuring the penetration depth (h), but also optically determining the projected contact area (A) in an in-situ manner under the applied load of indentation, leading to a quantitative characterization of mechanical characteristics without any of undesirable approximations/assumptions that are required in the conventional nanoindentation testing. The instrumented indentation microscope can therefore measure the projected contact area both for "sink-in" and "pile-up" contact surface profiles (refer to Patent Literature 1, Patent Literature 2, Patent Literature 3, Patent Literature 4, Patent Literature 5, Non Patent Literature 1, Non Patent Literature 2, Non Patent Literature 3, and Non Patent Literature 4).

CITATION LIST

Patent Literature

[Patent Literature 1] Japanese Patent Application Laid-Open No. 2005-195357 (U.S. Pat. No. 4,317,743)
[Patent Literature 2] Utility Model Registration No. 3182252
[Patent Literature 3] Japanese Patent Application Laid-Open No. 2015-175666 (U.S. Pat. No. 6,278,512)
[Patent Literature 4] International Publication No. 2016/194985
[Patent Literature 5] Japanese Patent Application Laid-Open No. 2017-146294

Non Patent Literature

[Non Patent Literature 1] T. Miyajima and M. Sakai, Optical indentation microscopy—a new family of instrumented indentation testing, Philosophical Magazine, Vol. 86, pp. 5729-5737 (2006)
[Non Patent Literature 2] M. Sakai, N. Hakiri, and T. Miyajima, Instrumented indentation microscope: A powerful tool for the mechanical characterization in microscales, J. Mater. Res., Vol. 21, Issue No. 21, pp. 2298-2303 (2006)
[Non Patent Literature 3] M. Sakai, S. Kawaguchi, and N. Hakiri, Contact-area-based FEA study on conical indentation problems for elastoplastic and viscoelastic-plastic bodies, J. Mater. Res., Vol. 27, No. 1, pp. 256-265 (2012)
[Non Patent Literature 4] T. Mineta, S. Miura, K. Oka, and T. Miyajima, Plastic deformation behavior of Mg—Y alloy single crystals observed using in situ Brinell indentation, Materials Transactions, Vol. 59, No. 4, pp. 602-611 (2018).

SUMMARY OF INVENTION

Technical Problem

However, in characterizing the mechanical properties of a specimen by indentation test method, it is requisite to take into account the effect of surface adhesion of the specimen on the indentation contact behavior. In the cases of so-called the hard materials having rather large elastic modus (the plane strain Young's modulus, $E' \geq 100$ GPa) such as the engineering materials of metals and ceramics, due to their large elastic moduli, the surface adhesion, even if there exists, makes a rather minor effect on their contact behavior. In most cases, therefore, we can neglect the surface adhesion in their indentation contact testing.

On the other hand, the elastic moduli of soft materials including organic polymers, biomaterials, and microbiological mediums are rather small, and fall in the range of $E' \approx 1$ Pa-100 MPa, where the surface adhesion plays an essential role in their mechanical characteristics and functions, leading to critical difficulties in quantitatively characterizing the mechanical properties through using the conventional nanoindentation test systems.

The present invention has been made in view of such circumstances and aims to provide a test technique and analysis for simultaneously characterizing the adhesion energy as well as the various mechanical properties of soft material through taking into account the adhesion force at the contact interface between the material tested and the indenter.

Solution to Problem

The present invention provides the following technical method and procedure for solving the problems and issues described above.

A test method for characterizing the mechanical properties including the surface adhesion energy γ on the basis of the experimentally derived P-A relationship, where P means the indentation load under the penetration depth h of an indenter pressed onto a test specimen with surface adhesion, and A means the contact area of indentation at the contact radius a under the applied load of P.

Advantageous Effects of Invention

Based the present invention, it is possible to provide an indentation test method for simultaneously characterizing in a quantitative manner the adhesion energy as well as the various mechanical properties of soft materials with surface adhesion.

DESCRIPTION OF EMBODIMENTS

Figure 1:
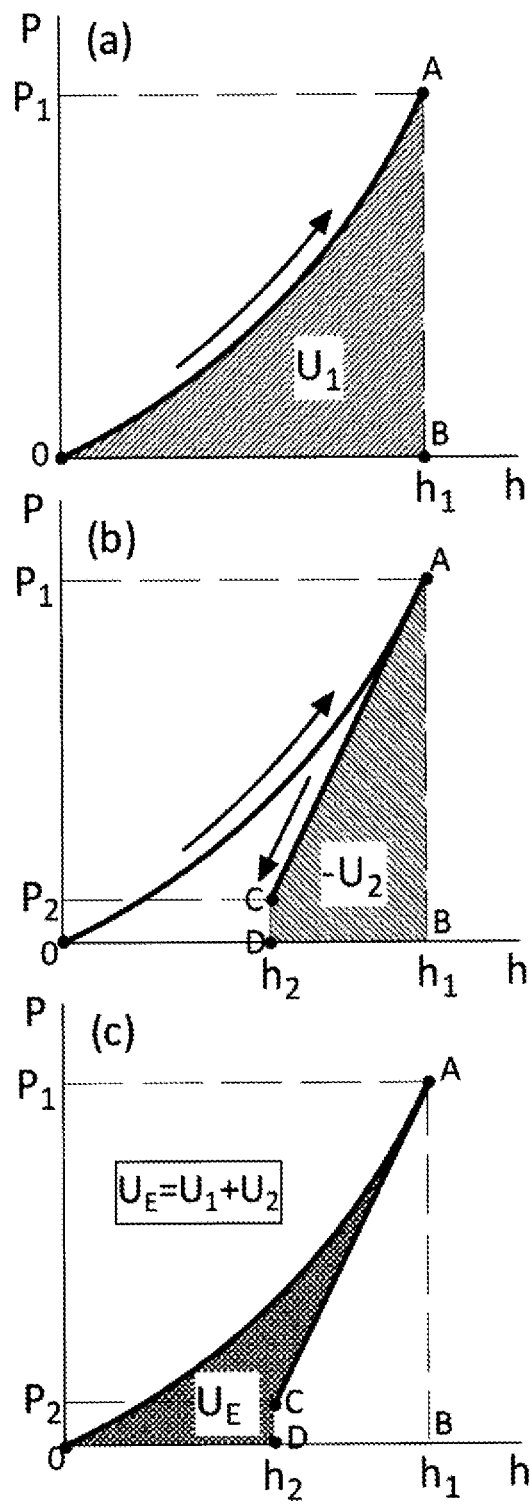
FIG. 1 is a diagram used for the energy-based considerations on the indentation contact processes of an elastic body with surface adhesion: (a) the indentation loading path of an elastic body without surface adhesion (the line OA), (b) the unloading path associated with the incremental increase of surface adhesion (the line AC), (c) the elastic stored energy $U_E$ of the elastic body with surface adhesion at the point A.

Hereinafter, the embodiments of the present invention will be described.

An axisymmetric indenter with an arbitrary shape is penetrated into an elastic body having the elastic modulus (the plane strain Young's modulus) of E' under the indentation load P, resulting in the penetration depth of h, and the contact radius of a at this time. It is assumed that the elastic modulus of the indenter is sufficiently larger than that of the test specimen (the E'-value of a diamond indenter is about 1000 GPa, and about 410 GPa of a sapphire indenter, by way of example). In the case where the elastic body has a surface adhesion, the indenter is withdrawn to the elastic body. That is, the surface adhesion induces "negative" contact pressure.

This fact implies that the indentation load P at the contact radius a will be smaller than that of the elastic body without surface adhesion. The JKR theory models the surface adhesion as the negative contact pressure acting on the flat-ended cylindrical punch with the radius a. In the present theoretical considerations, the JKR theory that has only been applied to spherical indentation will be extended to the conventional pyramid/cone indentations including the Vickers, Berkovich as well as the Rockwell indentations.

The contact pressure distribution p(r) of a flat-ended cylindrical indenter having a radius a is given by the following Formula.

[Equation 1]

$$p_F(r) = p_F \left[ 1 - \left(\frac{a}{r}\right)^2 \right]^{-1/2}; 0 \le r < a \quad (1)$$

In the above equation, the suffix F indicates a flat-ended cylindrical indenter (Flat punch), and r indicates the radius from the indentation axis (z-axis).

In the case where the surface adhesion is expressed using Formula (1), the coefficient $p_F$ has a "negative value" ($p_F < 0$) because the indenter is withdrawn to the surface of elastic body. Similarly, the indentation pressure distribution $p_s(r)$ of the spherical indenter can be expressed using the following Formula.

[Equation 2]

$$p_S(r) = p_S\left[1 - \left(\frac{a}{r}\right)^2\right]^{1/2}; \; 0 \le r < a \quad (2)$$

Furthermore, the indentation pressure distribution $P_C(r)$ of the conical indenter can be expressed using the following Formula.

[Equation 3]

$$p_C(r) = p_C \cosh^{-1}(a/r); 0 \le r < a \quad (3)$$

In Formulas (2) and (3), the suffixes S and C of the coefficients $p_s$ and $p_c$ represent a spherical indenter (Sphere) and a conical indenter (Cone), respectively.

Therefore, in the indentation to a perfectly elastic body having a surface adhesion, the contact pressure distribution generated immediately beneath the indenter can be expressed by the following Formula in the case of a spherical indenter by superimposing the pressure distributions of Formulas (1) and (2).

[Equation 4]

$$p(r) = p_S\left[1 - \left(\frac{a}{r}\right)^2\right]^{1/2} + P_F\left[1 - \left(\frac{a}{r}\right)^2\right]^{-1/2} \quad (4)$$

In the case of a conical indenter, the distribution can be expressed by the following Formulas by superimposing the pressure distributions of Formulas (1) and (3).

[Equation 5]

$$p(r) = p_C \cosh^{-1}(a/r) + p_F\left[1 - \left(\frac{a}{r}\right)^2\right]^{-1/2} \quad (5)$$

Meanwhile, the contact surface profile $u_z(r)$ ($0 \le r \le a$) beneath a spherical indenter having the radius of R can be expressed by the following geometric relation.

[Equation 6]

$$u_Z(r) = h - \frac{r^2}{2R} \quad (6)$$

Similarly, the contact surface profile $u_z(r)$ ($0 \le r \le a$) induced beneath a conical indenter having the inclined face-angle of $\beta$ can be expressed by the following geometric expression.

[Equation 7]

$$u_Z(r) = h - r \tan \beta \quad (7)$$

Through combining the contact pressure distributions p(r) of Formulas (1) to (5) and the contact surface profiles $u_z(r)$ of Formulas (6) or (7), the following expression is finally obtained for spherical indentation:

[Equation 8]

$$\frac{\pi p_S}{4aE'}(2a^2 - r^2) + \frac{\pi a p_F}{E'} = h - \frac{r^2}{2R} \quad (8)$$

Notice the algebraic identity of Formula (8) as to the variable $r$, then the following relations are obtained;

[Equation 9]

$$p_S = \frac{2aE'}{\pi R} \quad (9)$$

[Equation 10]

$$h = \frac{\pi a}{2E'}(p_S + 2p_F) \quad (10)$$

By further using Formula (4), the indentation load (P) of spherical indentation is expressed with the following formula:

[Equation 11]

$$P = \left(\frac{2}{3}p_S + 2p_F\right)\pi a^2 \quad (11)$$

Similar mathematical operations conducted for spherical indentation finally lead to the key expressions of the conical indentation as follows;

[Equation 12]

$$\frac{\pi a p_C}{E'}\left(1 - \frac{2}{\pi}\frac{r}{a}\right) + \frac{\pi a p_F}{E'} = h - r \tan \beta \quad (12)$$

[Equation 13]

$$p_C = \frac{E'}{2}\tan \beta \quad (13)$$

[Equation 14]

$$h = \frac{\pi a}{E'}(p_C + p_F) \quad (14)$$

[Equation 15]

$$P = (p_C + 2p_F)\pi a^2 \quad (15)$$

Through these mathematical procedures, the coefficients of contact pressure distribution, $p_s$ and $p_c$ are related to the elastic modulus E' in Formulas (9) and (13).

Meanwhile, it is impossible to determine the coefficient of contact pressure distribution $p_F$ of flat-ended cylindrical indenter in terms of the surface adhesion via the preceding mathematical operation. To overcome this difficulty, therefore, noticing the fact that the adhesion force $\gamma$ (N/m) is equivalent to the adhesion energy $\gamma$ (J/m$^2$), an energy-based consideration will be made in what follows for determining $p_F$.

In the first step of indentation contact process, suppose an axisymmetric indenter pressed onto an elastic body without surface adhesion to the indentation load $P_1$ as depicted in FIG. 1, at which the penetration depth $h_1$ and the contact radius $a_1$ are assumed to be induced. The elastic strain energy $U_1$ stored in the elastic body during this penetration process is described by the following integral,

[Equation A1]

$$U_1 = \int_0^{h_1} P dh$$

The application of this integral to the spherical indentation results in

[Equation 16]

$$U_1 = \frac{2}{15} \frac{\pi^2 a_1^3}{E'} p_{S1}^2 \quad (16)$$

and to the conical indentation leads to

[Equation 17]

$$U_1 = \frac{\pi^2 a_1^3}{3E'} p_{C1}^2 \quad (17)$$

The elastic strain energy $U_1$ stored in the body is given by the area OABO depicted in FIG. 1(a). In Formulas (16) and (17), $p_{S1}$ and $p_{C1}$ are the coefficients of contact pressure distribution of spherical and conical indenters at the contact radius $a_1$, respectively given by $p_{S1}=2a_1 E'/\pi R$ and $p_{C1}=(E'/2)\tan\beta$. In the conical indentation, $p_{C1}$ is a constant independent of the contact radius due to its geometric similarity.

In the subsequent second step of indentation contact process, at the point A ($P_1$, $h_1$, $a_1$) in FIG. 1(b), let us consider the variation of the strain energy associated with the incremental surface adhesion from 0 to $\gamma$ on the contact surface maintaining its contact area at $\pi a_1^2$.

This mechanical process implies that the indenter is progressively pulled to the contact surface, resulting in unloading, as shown in FIG. 1(b), along the linear line AC, since the contact area maintains constant. A part of the strain energy $U_1$ is released along this unloading path of the linear line AC.

The indentation contact state at the point C ($P_2$, $h_2$, $a_1$) is the equilibrium state of the elastic body having the surface energy of $\gamma$. This mechanical process along the line AC will be equivalent to the unloading process of a flat-punch with the radius $a_1$. The total energy released through this unloading process along the line AC is denoted by $U_2(<0)$ and given by the area ABDCA $(=-U_2)$ in FIG. 1(b).

As described above, the unloading process along the line AC is equivalent to the unloading process of the flat-ended cylindrical punch with the radius $a_1$. The P-h unloading path along the line AC is expressed by the following Formulas.

[Equation 18]

$$P = P_1 + 2\pi a_1^2 p_{F1} \quad (18)$$
$$= 2a_1 E'(h - h_1) + P_1$$
$$h = h_1 + \frac{\pi a_1}{E'} p_{F1}$$

where $p_{F1}$ ($<0$) is the coefficient of contact pressure distribution of flat-ended cylindrical punch with radius $a_1$, having a negative value due to the surface adhesion.

The load $P_1$ at point A shown in FIG. 1 can be expressed by the following Formula for spherical indentation.

$$P_1 = (2\pi a_1^3/3) p_{S1} \quad \text{[Equation A2]}$$

The load $P_1$ for conical indentation can be expressed by the following Formula.

$$P_1 = \pi a_1^2 p_{C1} \quad \text{[Equation A3]}$$

On the other hand, the released energy $U_2(<0)$ associated with the incremental surface adhesion is given by

[Equation A4]

$$U_2 = \int_{h_1}^{h_2} P dh = \int_{P_1}^{P_2} P \frac{dP}{2a_1 E'} = \frac{P_2^2 - P_1^2}{4 a_1 E'}$$

Therefore, the following expressions are finally obtained as the release energy $U_2$ for the spherical indentation;

[Equation 19]

$$U_2 = \frac{\pi^2 a_1^3}{E'} \left( \frac{2}{3} p_{S1} p_{F1} + p_{F1}^2 \right) \quad (19)$$

and for conical indentation;

[Equation 20]

$$U_2 = \frac{\pi^2 a_1^3}{E'} (p_{C1} p_{F1} + p_{F1}^2) \quad (20)$$

Therefore, the elastic strain energy $U_E$ when a spherical indenter is pressed onto the perfectly elastic body with "surface adhesion" until the contact radius becomes $a$, that is, the area ACDOA in FIG. 1(c) can be expressed by the following Formula through combining Formulas (16), (17), (19), and (20);

[Equation 21]

$$U_E (\equiv U_1 + U_2) = \frac{\pi^2 a^3}{E'} \left( \frac{2}{15} p_S^2 + \frac{2}{3} p_S p_F + p_F^2 \right) \quad (21)$$

Alternatively, the energy $U_E$ can also be expressed with the following Formula by substituting Formulas (9) and (10) into the above Formula.

[Equation 22]

$$U_E (\equiv U_1 + U_2) = \frac{\pi^2 a^3}{E'} \left\{ \frac{1}{5} \left( \frac{aE'}{\pi R} \right)^2 - \frac{2}{3} \frac{E'^2}{\pi^2 R} h + \left( \frac{E'}{\pi a} \right)^2 h^2 \right\} \quad (22)$$

On the other hand, the energy $U_E$ of conical indentation can be expressed by the following Formula.

[Equation 23]

$$U_E (\equiv U_1 + U_2) = \frac{\pi^2 a^3}{E'}\left(\frac{1}{3}p_C^2 + p_C p_F + p_F^2\right) \quad (23)$$

Alternatively, the energy $U_E$ can also be expressed by substituting Formulas (13) and (14) into the above Formula;

[Equation 24]

$$U_E (\equiv U_1 + U_2) = \frac{\pi^2 a^3}{E'}\left\{\frac{1}{3}\left(\frac{E'\tan\beta}{2}\right)^2 - \frac{E'^2 \tan\beta}{2\pi a}h + \left(\frac{E'}{\pi a}\right)^2 h^2\right\} \quad (24)$$

As mentioned in the preceding considerations, in the present indentation contact problem, the adhesive surface force introduces the surface energy $U_S$ which decreases when the surfaces come into intimately contact and increases when they separate. Therefore, we can write

[Equation 25]

$$U_S = -2\gamma\pi a^2 \quad (25)$$

The total energy (the Gibbs free energy) $U_T$ of the present mechanical system, therefore, is given by

[Equation 26]

$$U_T = U_E + U_S \quad (26)$$

In the mechanical equilibrium under a fixed depth of penetration that means none of external works applied to the system, the variation of total energy associated with incremental contact radius $\delta$ a results in

[Equation 27]

$$\left(\frac{\partial U_T}{\partial a}\right)_h = 0 \quad (27)$$

By substituting Formulas (21) to (26) into Formula (27), and by using Formulas (22) and (24), the following expression is obtained both for spherical and conical indentations.

$$(\partial U_E/\partial a)_h = (\pi^2 a^2/E') p_F^2 \quad \text{[Equation A5]}$$

Accordingly, the pressure distribution coefficient $p_F$ of the flat-ended cylindrical indenter is finally correlated to the adhesion energy $\gamma$ by the following Formula.

[Equation 28]

$$p_F = -\sqrt{\frac{4\gamma E'}{\pi a}} \quad (28)$$

Substituting the coefficients $p_S$ (Formula (9)), $p_C$ (Formula (13)), and $p_F$ (Formula (28)) obtained in the preceding considerations into Formulas (10) and (11), or to Formulas (14) and (15) leads to the key expressions of the h vs. a and the P vs. a relations (h: penetration depth, P: indentation load, a: contact radius).

The key expressions for spherical indentation are;

[Equation 29]

$$h = \frac{a^2}{R} - 2\sqrt{\frac{\pi\gamma}{E'}}\,a^{1/2} \quad (29)$$

[Equation 30]

$$P = \frac{4E'}{3R}a^3 - 4\sqrt{\pi\gamma E'}\,a^{3/2} \quad (30)$$

The key expressions for conical indentation are;

[Equation 31]

$$h = \frac{\pi\tan\beta}{2}a - 2\sqrt{\frac{\pi\gamma}{E'}}\,a^{1/2} \quad (31)$$

[Equation 32]

$$P = \left(\frac{E'}{2}\tan\beta\right)\pi a^2 - 4\sqrt{\pi\gamma E'}\,a^{3/2} \quad (32)$$

$$= \left(\frac{E'}{2}\tan\beta\right)A - 4\sqrt{\frac{\gamma E'}{\pi^{1/2}}}\,A^{3/4}$$

Here, A ($=\pi a^2$) represents the contact area of indentation. The coefficient of surface adhesion in Formula (32) is defined by the following Formula.

[Equation 33]

$$\lambda_E = 4\sqrt{\frac{\gamma E'}{\pi^{1/2}}} \quad (33)$$

$\lambda_E$ is referred to as the adhesion toughness that stands for the fracture toughness of interfacial delamination between the tip-of-indenter and the material indented (the suffix E indicates elastic) The physical dimension of the adhesion toughness $\lambda_E$ is [Pa·m$^{1/2}$], being the same as the mode-I fracture toughness $K_{Ic}$;

[Equation 34]

$$K_{Ic}(\equiv\sqrt{2\gamma E'}) \quad (34)$$

By substituting the adhesion energy $\gamma=0$ into Formulas (29) to (32), those Formulas are naturally reduced to the well-known indentation contact mechanics relations of the perfectly elastic body without surface adhesion.

The elastoplastic body with surface adhesion will be examined in what follows.

Unlike the perfectly elastic body examined in the preceding considerations, an elastoplastic body leads to a mechanical process in which the plastic deformation (plastic flow) in the vicinity of the surface reduces the surface adhesion.

In consideration of the effect of plastic deformation on the adhesion toughness, therefore, the JKR-based elastic theory (Formula (32)) can be extended to the elastoplastic region by the following Formula.

[Equation 35]

$$P = H_M A - \lambda_{EP} A^{3/4} \quad (35)$$

Here, $H_M$ represents the Meyer hardness, and the elastoplastic adhesion toughness $\lambda_{EP}$ is defined by the following Formula.

[Equation 36]

$$\lambda_{EP} = 4\sqrt{\frac{\gamma_{EP} E'}{\pi^{1/2}}} \tag{36}$$

The value $\gamma_{EP}$ in Formula (36) represents the surface energy (surface force) under plastic flow, that is, represents the elastoplastic surface force (elastoplastic surface energy). There are no analytical solutions for the correlation between the elastoplastic adhesion toughness $\lambda_{EP}$ or the elastoplastic adhesion energy $\gamma_{EP}$ and the yield stress Y. There is no choice, therefore, but to derive these correlations as empirical rules through the FEA-based numerical analysis.

The preceding considerations have been made for pyramid/cone indentation with arbitrary inclined-face-angle of β, implying that all the experimental procedures combined with the analytical formulas given above are applicable to the conventional Vickers/Berkovich indentation as well as conical indentation.

The instrumented indentation microscope is designed for quantitatively determining the contact area A and the penetration depth h in an in-situ manner under the indentation load P applied to the test specimen. Accordingly, the elastic modulus E', yield stress Y, as well as the adhesion energy γ can readily be determined through applying the experimental data to the Formulae given in the preceding considerations.

Figure 2:
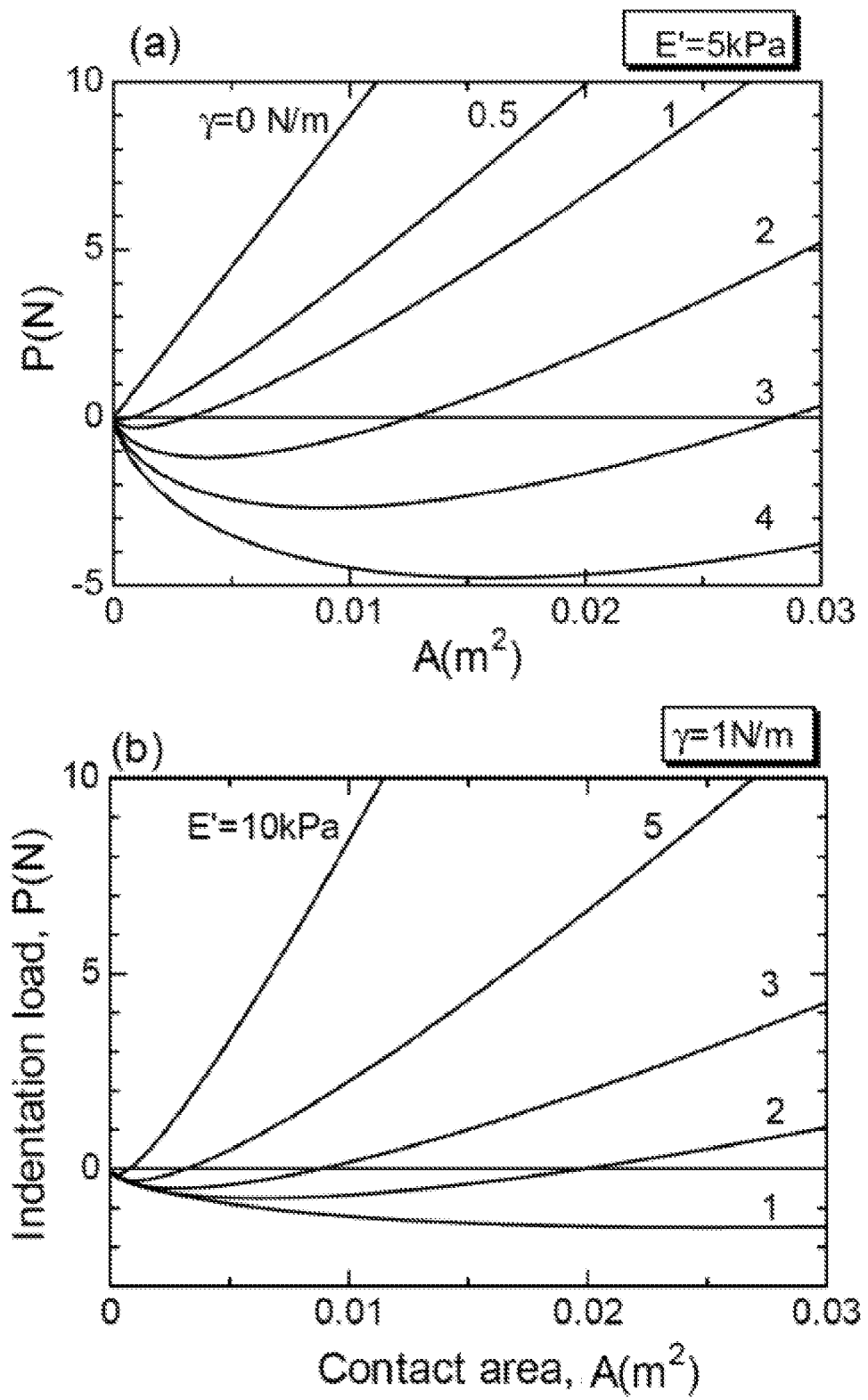
FIG. 2 is the P-A relations of conical indentation for the elastic bodies with surface adhesion (JKR-based theory): (a) E'=5 kPa, γ=0 N/m to 4 N/m, and (b) γ=1 N/m, E'=1 kPa to 10 kPa.

FIGS. 2(a) and 2(b) shows the P-A relations (Vickers/Berkovich equivalent conical indenter (β=19.7°)) analytically calculated from Formulas (32) and (33). In FIG. 2(a), the P-A linear relation with γ=0 N/m, i.e., P=(E' tan β/2)A, represents the P-A relation of a perfectly elastic body without surface adhesion. It is clearly seen in FIG. 2 that the effect of surface adhesion on the P-A relations becomes more significant with the increase in the adhesion energy γ and with the decrease in the elastic modulus E'. In other words, the higher the adhesion energy γ and the lower the elastic modulus E', the greater the effect of the surface adhesion force on the indentation contact behavior, resulting in significant nonlinear P-A relations.

The effect of surface adhesion on the indentation contact mechanics of viscoelastic bodies will be examined in what follows.

By applying the "elastic-viscoelastic corresponding principle" to the JKR theory (Formula (32)), the following Formula is obtained in the Laplace space for the constitutive equation of a viscoelastic body with surface adhesion.

[Equation 37]

$$\overline{P}(p) = \left(\frac{E'^*(p)\tan\beta}{2}\right)\overline{A}(p) - \lambda_{VE}^*(p)\overline{A}(p)^{3/4} \tag{37}$$

In Formula (37), $\overline{P}(p), \overline{A}(\boldsymbol{p}), E'^*(\boldsymbol{p}), \lambda_{VE}^*(\boldsymbol{p})$ are, respectively, defined by the following equations:

[Equation 38]

$$\overline{P}(p) = \left(\frac{E'^*(p)\tan\beta}{2}\right)\overline{A}(p) - \lambda_{VE}^*(p)\overline{A}(p)^{3/4} \tag{38}$$

[Equation 39]

$$\overline{A}(p) = \int_0^\infty A(t)e^{-pt}dt \tag{39}$$

[Equation 40]

$$E'^*(p) = p\int_0^\infty E'_{relax}(t)e^{-pt}dt \tag{40}$$

[Equation 41]

$$\lambda_{VE}^*(p) = 4\sqrt{\frac{\gamma}{\pi^{1/2}}}\, p\int_0^\infty \sqrt{E'_{relax}(t)}\, e^{-pt}dt \tag{41}$$

Therefore, the inverse Laplace transform of Formula (37) directly results in "the constitutive equation of viscoelastic body having surface adhesion" in real space as follows;

[Equation 42]

$$P(t) = \left(\frac{\tan\beta}{2}\right)\int_0^t E'_{relax}(t-t')\frac{dA(t')}{dt'}dt' - 4\sqrt{\frac{\gamma}{\pi^{1/2}}}\int_0^t \sqrt{E'_{relax}(t-t')}\,\frac{dA(t')^{3/4}}{dt'}dt' \tag{42}$$

Examine a stepwise indentation to a constant contact area $A_0$, as an example of viscoelastic indentation test:

[Equation 43]

$$A(t)=u(t)A_0 \tag{43}$$

The function u(t) in Formula (43) stands for the Heaviside step function. The effect of surface adhesion on the indentation load relaxation will be discussed in what follows.

Formula (43) along with the relational of du(t)/dt=δ(t) (Dirac delta function) applied to Formula (42) results in;

[Equation 44]

$$P(t) = \left(\frac{\tan\beta}{2}A_0\right)E'_{relax}(t) - 4\sqrt{\frac{\gamma}{\pi^{1/2}}}\, A_0^{3/4}\sqrt{E'_{relax}(t)} \tag{44}$$

Suppose a Maxwell viscoelastic liquid for simplicity in the following numerical procedures; the relaxation modulus $E'_{relax}(t)$ is given by

[Equation 45]

$$E'_{relax}(t) = E'_g \exp\left(-\frac{t}{\tau}\right) \tag{45}$$

Figure 3:
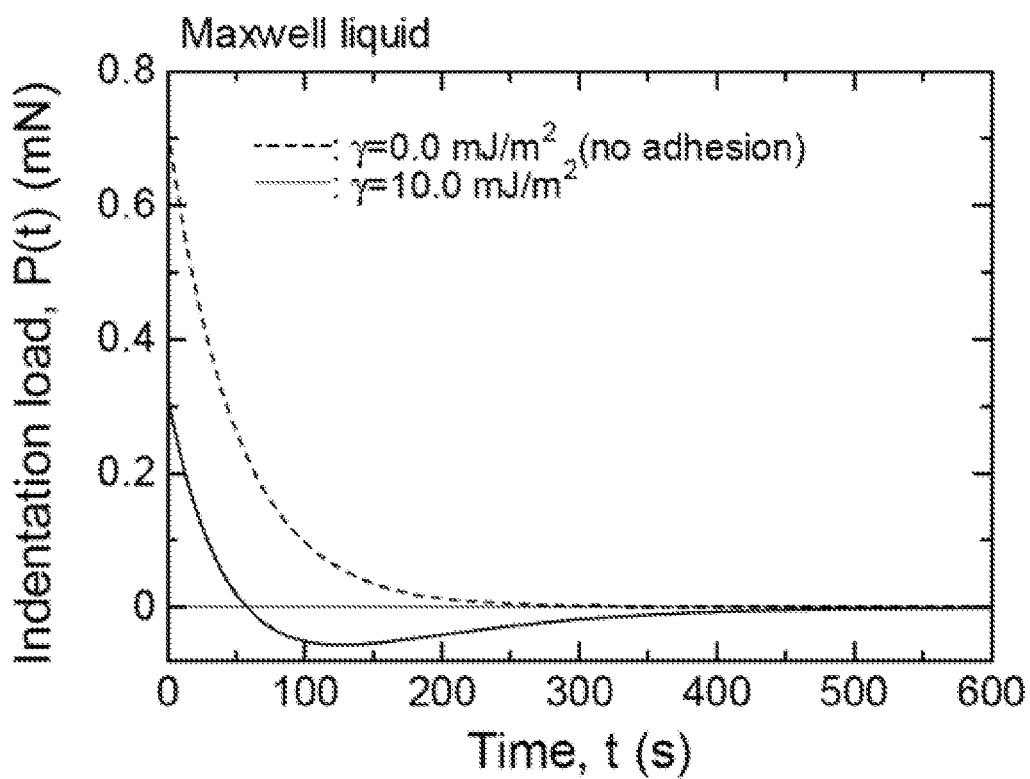
FIG. 3 is the indentation load relaxation curves of a Maxwell viscoelastic liquid with (the broken lines; γ=10 and 100 mJ/m²) and without (the solid line) surface adhesion.

The numerical results of the indentation load relaxation curve (P(t) vs. t) obtained through substituting Formula (45) into Formula (44) is plotted in FIG. 3 (solid line) (Vickers/Berkovich equivalent conical indenter with the inclined face angle of β=19.7°; adhesion energy γ=10 mJ/m², elastic modulus E'$_g$=20 kPa, relaxation time τ=50 s, stepwise contact area A$_0$=0.2 mm²).

In FIG. 3, for comparison, the broken line indicates the load relaxation curve of the Maxwell liquid having no surface adhesion. Since the surface adhesion withdraws the tip-of-indenter to the surface of viscoelastic body, a negative region appears in its load relaxation. In addition, it is worthy of note that the time to the complete relaxation (P(t)→0) is shifted to a longer time side due to the presence of surface adhesion.

Next, the present invention will be described in more detail with the following Examples.

Example 1

In order to deepen the understanding of the effect of surface adhesion on the elastic/elastoplastic indentation contact problem, the finite element method was selected as a numerical analysis to examine the problem. In the present finite element analyses, the commercially available finite element software package of ANSYS was selected; having been recognized well in numerically analyzing the contact problems including elastic/elastoplastic/viscoelastic deformation and flow.

Figure 4:
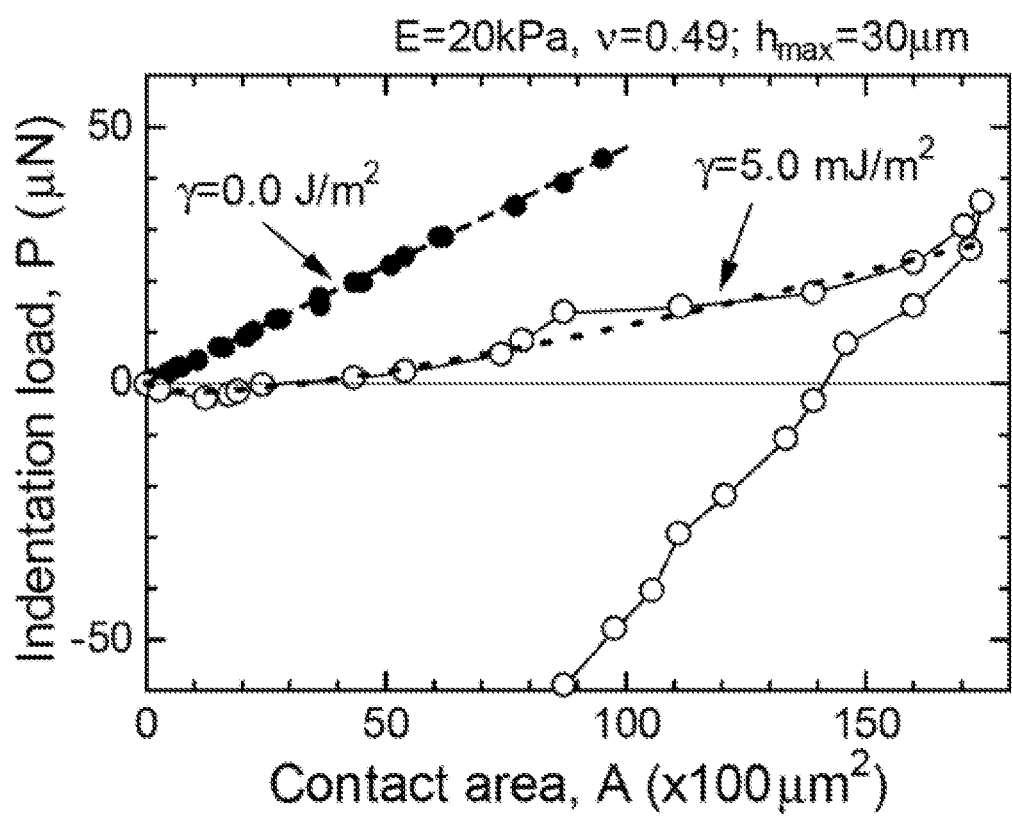
FIG. 4 is the FEA-based (Finite Element Analysis based) P-A loading-unloading relations of a perfectly elastic body with the elastic modulus E'=20 kPa. The symbols ○ and ● indicate the results of the elastic body with surface adhesion of γ=5.0 mJ/m² and without surface adhesion (γ=0.0 mJ/m²), respectively. The dashed lines indicate the analytical relation of the JKR-theory.

As an example of the finite element analysis applied to a perfectly elastic body having the elastic modulus E'=20 kPa, the numerical results of the loading-unloading P-A relations for the maximum penetration depth h$_{max}$=30 μm are shown in FIG. 4 in comparison with the analytical result of the elastic JKR theory (FIG. 2).

The P-A loading-unloading relationship (the closed circle; ●) of the elastic body without surface adhesion (γ=0.0 J/m²) is linear and none of hysteresis is observed in its loading/unloading paths. Note that the broken line (the analytical solution of P=(E' tan β/2)A) in FIG. 4 coincides quite well with the FEA-derived numerical results. However, for the P-A loading-unloading relationship (the open circle (○) and dotted line) of the perfectly elastic body with surface adhesion (γ=5.0 mJ/m²), its loading P-A relation becomes nonlinear, and a remarkable hysteresis is observed along the unloading pass, although it is a perfectly elastic body. It will be worthy of note, furthermore, that the indentation loads are always extremely smaller than those of the elastic body without surface adhesion, since the surface adhesin withdraws the tip-of-indenter to the surface of the elastic body indented.

Note the fact in FIG. 4 that there exists a significant difference in the maximum contact areas A$_{max}$ of the bodies with and without surface adhesion, although their maximum penetration depth is controlled to the same value of h$_{max}$=30 μm; A$_{max}$≈100 (×100 μm²) for the body without surface adhesion (γ=0.0 J/m²), while A$_{max}$≈180 (×100 μm²) for the body with surface adhesion (γ=5.0 mJ/m²) due to the attractive adhesion force.

The dotted line along the symbols ○ in FIG. 4 is the P-A loading path predicted by the JKR theory, while the theory cannot describe the subsequent unloading path. As well shown in FIG. 4, the FEA numerical results (the open circles; ○) precisely reproduce the JKR theory (Formula (32); the dotted line).

Example 2

The effect of plastic flow on the adhesion toughness is examined through the FEA-based numerical study.

Figure 5:
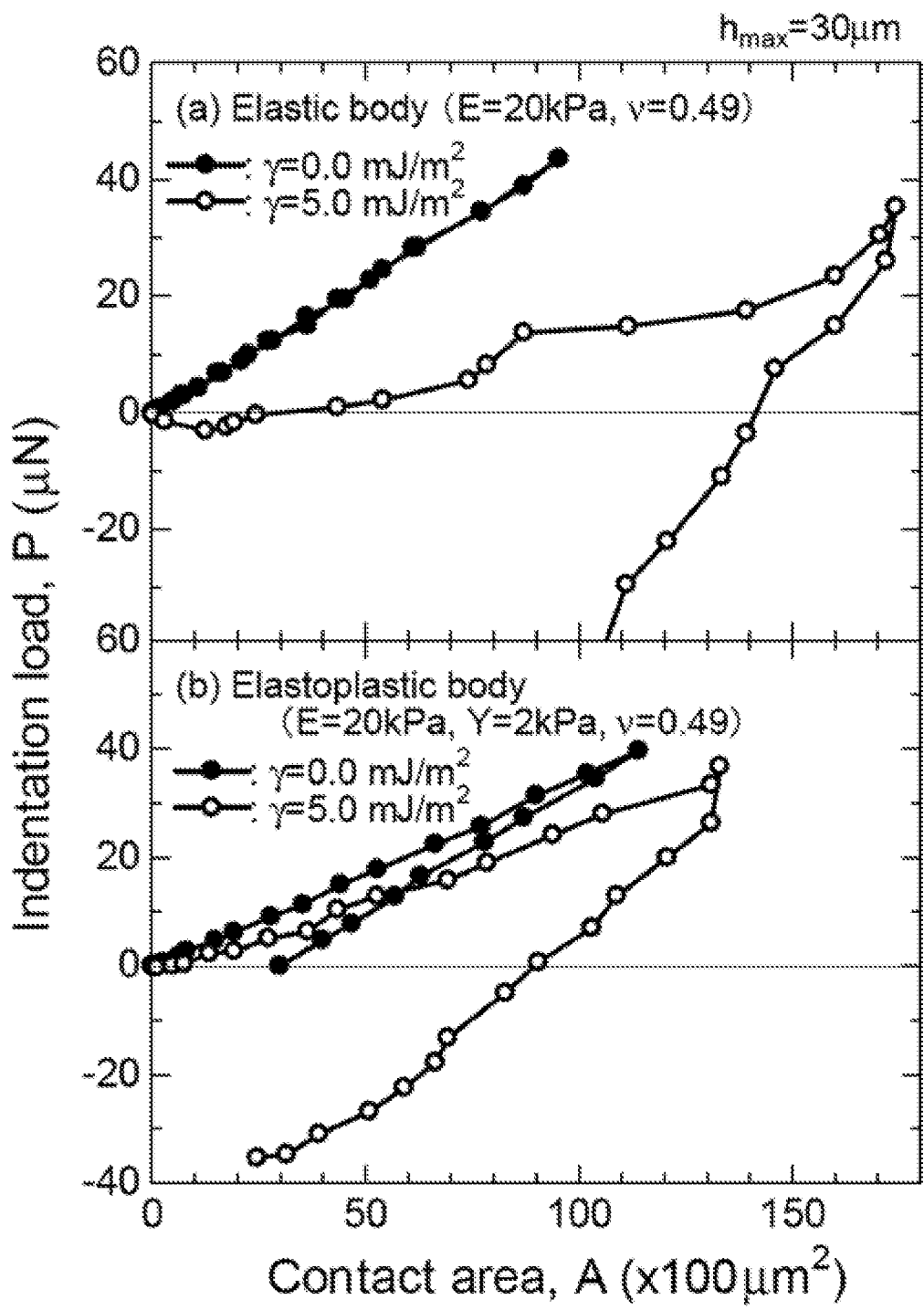
FIG. 5 is the P-A loading/unloading relations (FEA-based numerical results) of (a) a perfectly elastic bod (E'=20.0 kPa), and (b) an elastoplastic body (E'=20.0 kPa, Y=2.0 kPa). The open circles (○) and the closed circles (●) indicate the P-A relations with (γ=5.0 mJ/m²) and without (γ=0.0 mJ/m²) surface adhesion, respectively.

FIG. 5 shows the FEA-based numerical results of the P vs. A relations. FIG. 5(a) is the result of the perfectly elastic body (elastic modulus E'=20 kPa), and FIG. 5(b) is the result of the elastoplastic body (elastic modulus E'=20 kPa, yield stress Y=2 kPa). In these P-A plots, the closed circles (●) indicate the results of the elastic and the elastoplastic bodies without surface adhesion (γ=0.0 mJ/m²), while the open circles (○) represent the effect of surface adhesion (γ=5.0 mJ/m²) on the respective P-A relations.

FIG. 5 indicates that the plastic flow reduces the effect of surface adhesion on the P-A loading/unloading curve through the reduction in the adhesion toughness λ$_{EP}$ along with the adhesion energy γ$_{EP}$ (refer to Formula (36)).

Figure 6:
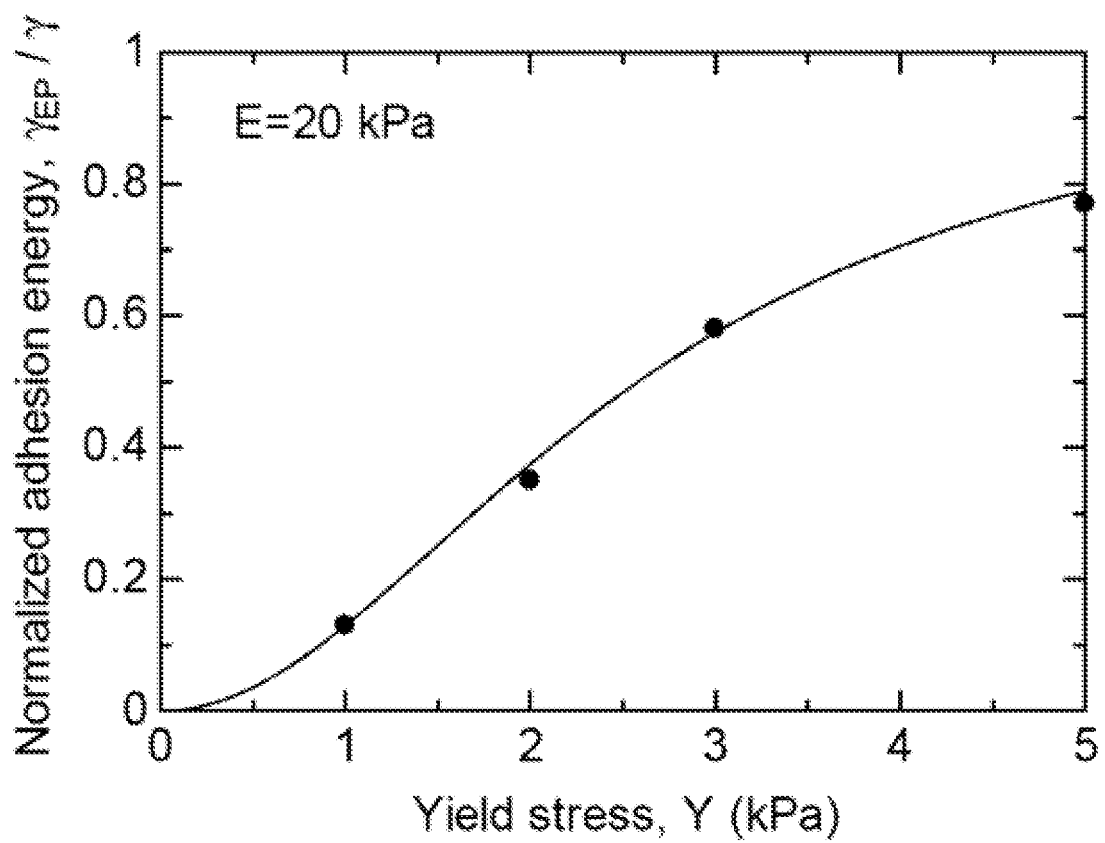
FIG. 6 is the correlation between the elastoplastic surface energy $\gamma_{EP}$ and the yield stress Y of the elastoplastic bodies (E=20 kPa) (FEA-based numerical results).

The effect of the plastic flow on the elastoplastic adhesion energy γ$_{EP}$ is shown in FIG. 6 (FEA-based numerical results of the elastoplastic bodies with E=20 kPa having various values of the yield stress Y). The elastoplastic adhesion energy γ$_{EP}$ monotonically decreases with the enhanced plastic flow, that is, with the decrease in the yield stress Y.

Figure 7:
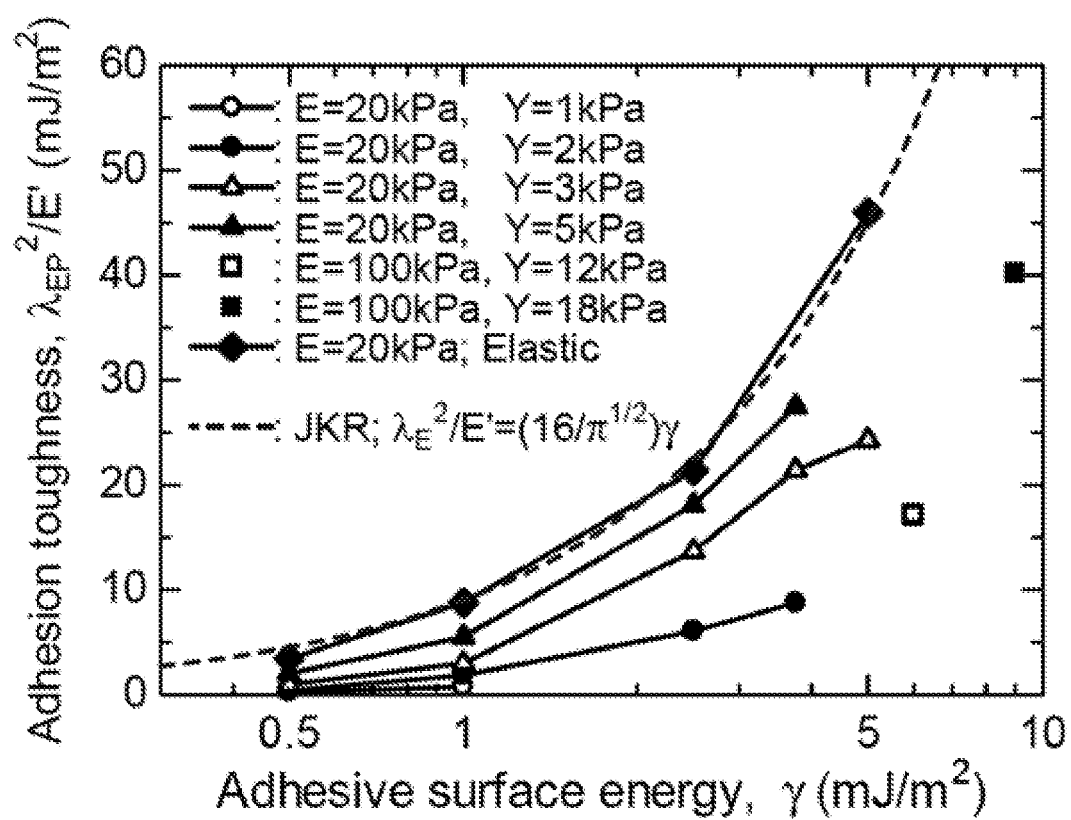
FIG. 7 is the correlations between the adhesion toughness $\lambda_{EP}^2/E'$ and the adhesive surface energy γ of elastoplastic bodies (FEA-based numerical results). The dashed line indicates the JKR-theory of perfectly elastic body.

The correlations between the elastoplastic adhesion toughness (the following formula) and the adhesion energy γ are plotted in FIG. 7 for the elastoplastic bodies having various values of the elastic modulus E' and the yield stress Y (FEA-based numerical results).

[Equation 46]

$$\lambda_{EP}^2/E'(\equiv(16/\sqrt{\pi})\gamma_{EP}) \quad (46)$$

The following conclusions are obtained from FIGS. 6 and 7 for the effect of plastic flow on the elastoplastic adhesion toughness.

Both the elastoplastic adhesion toughness λ$_{EP}$ and the elastoplastic adhesion energy γ$_{EP}$ decrease with the reduction in the yield stress Y, that is, with the enhancement of plastic flow. In other words, the effect of surface adhesion on the elastoplastic indentation contact diminishes with enhancing plastic flow.

Conversely, both of γ$_{EP}$ and λ$_{EP}$ increase such that γ$_{EP}$→γ and λ$_{EP}$→λ$_E$ together with the increase in the yield stress Y, The indentation contact behavior of these elastoplastic bodies, therefore, realizes the perfectly elastic body that is well described with the elastic JKR theory.

Figure 8:
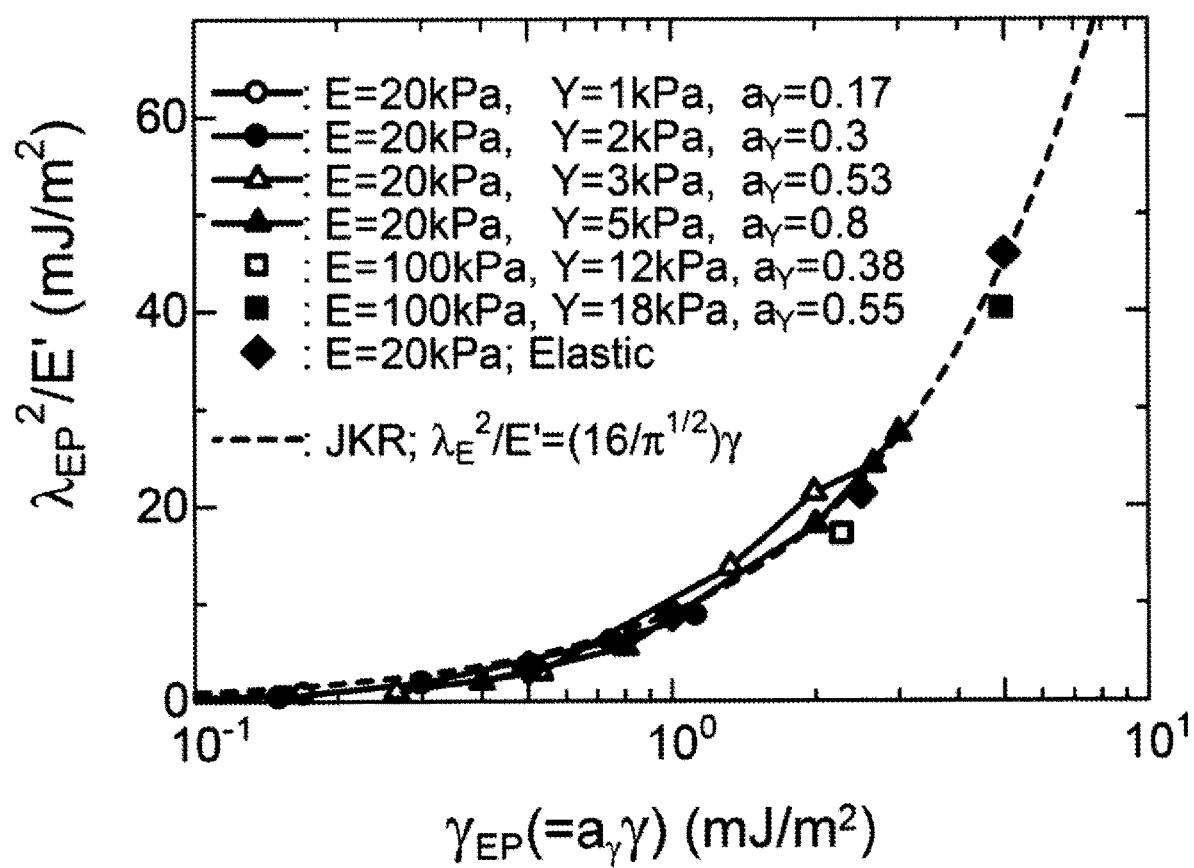
FIG. 8 is the $\lambda_{EP}^2/E'$ vs $Y_{EP}$ master curve made by horizontally shifting the respective $\lambda_{EP}^2/E'$ vs γ curves in FIG. 7 and superimposing onto the perfectly elastic JKR-curve (the dashed line).

FIG. 8 illustrates the master curve obtained by horizontally shifting each "λ$_{EP}^2$/E' vs. γ" plot in FIG. 7 of various elastoplastic bodies along the logarithmic γ-axis to the lower energy side and superimposing onto the theoretical JKR curve of perfectly elastic body (the broken line in FIGS. 7 and 8).

The a$_γ$-value on the horizontal axis in FIG. 8 is a dimensionless quantity referred to as the shift factor that is utilized in the superposition procedure conducted in FIG. 7. The shift factor a$_γ$ is to be linked to the elastoplastic adhesion energy γ$_{EP}$ normalized with the adhesion energy γ via the following Formula:

[Equation 47]

$$a_\gamma = \gamma_{EP}/\gamma \quad (47)$$

From the above considerations and Formula (47), the shift factor a$_γ$ has a strong correlation with the plastic deformation and flow of elastoplastic body, that is, with the plastic index (PI (≡ε$_Y$E'/cY)); a$_γ$→1 for γ$_{EP}$→γ in the extreme of perfectly elastic deformation (PI↓0), while a$_γ$→0 for γ$_{EP}$→0 in the extreme of fully plastic deformation (PI↑0).

Figure 9:
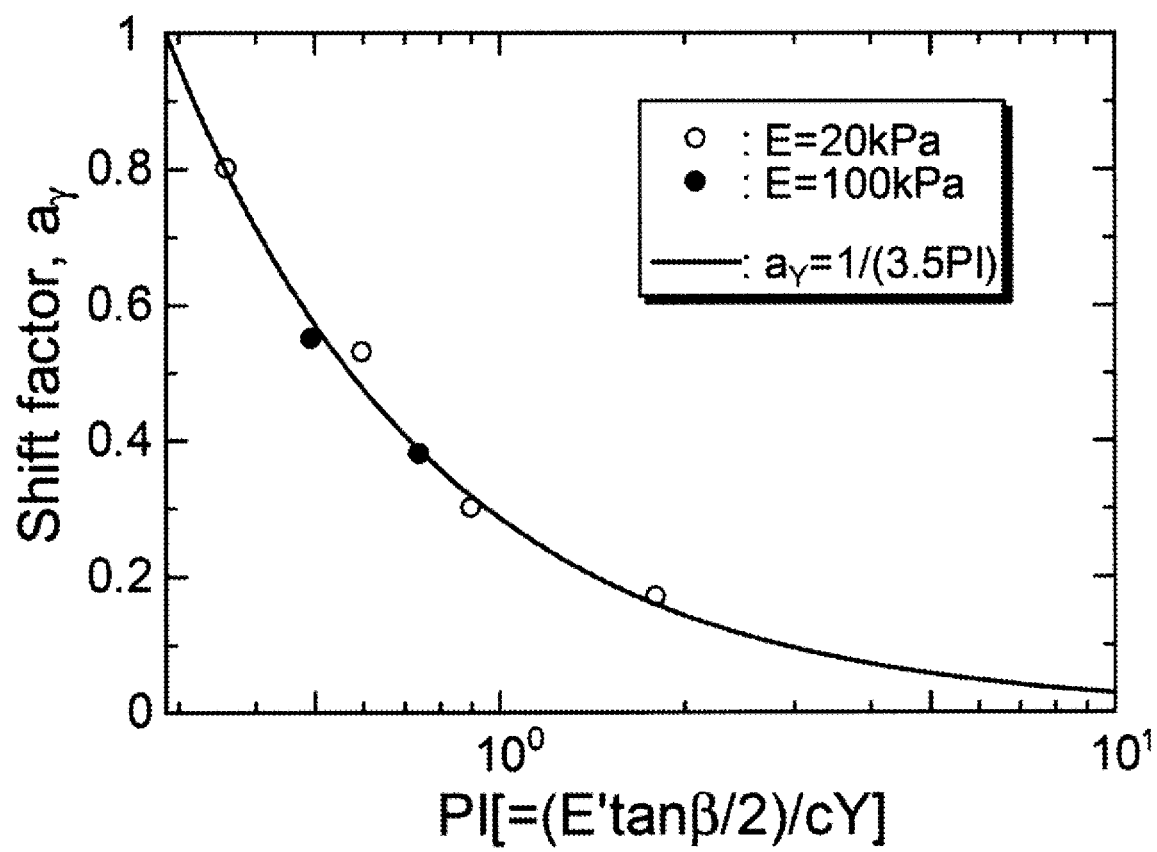
FIG. 9 is the correlation between the plastic index PI ($\equiv \varepsilon_f E'/cY$) and the shift factor $a_\gamma$ ($\equiv \gamma_{EP}/\gamma$) that is utilized in FIG. 8 to make the master curve (FEA-based numerical result). The solid line indicates the best-fitted empirical relation of $a_\gamma = 1/(3.5 PI)$.

To verify these considerations, the quantitative correlation (FEA-based numerical results) between the shift factor a$_γ$ (≡γ$_{EP}$/γ) and the plastic index PI (≡ε$_Y$E'/cY) is shown in FIG. 9.

The best-fitting empirical formula for duplicating the FEA-derived correlation shown in FIG. 9 is given by

[Equation 48]

$$a_Y = 1/(3.5PI); PI \geq 0.286 \tag{48}$$

Example 3

Silicone rubber was selected as a perfectly elastic model specimen; both the loading and unloading P-A paths are linear and none of hysteresis is observed. A glue (3M, PN: 55) was coated on the silicone rubber to realize the surface adhesion.

All the indentation tests were conducted by the use of instrumented indentation microscope with a Berkovich indenter (diamond trihedral pyramid indenter with the inclined face-angle of $\beta=24.75°$).

Figure 10:
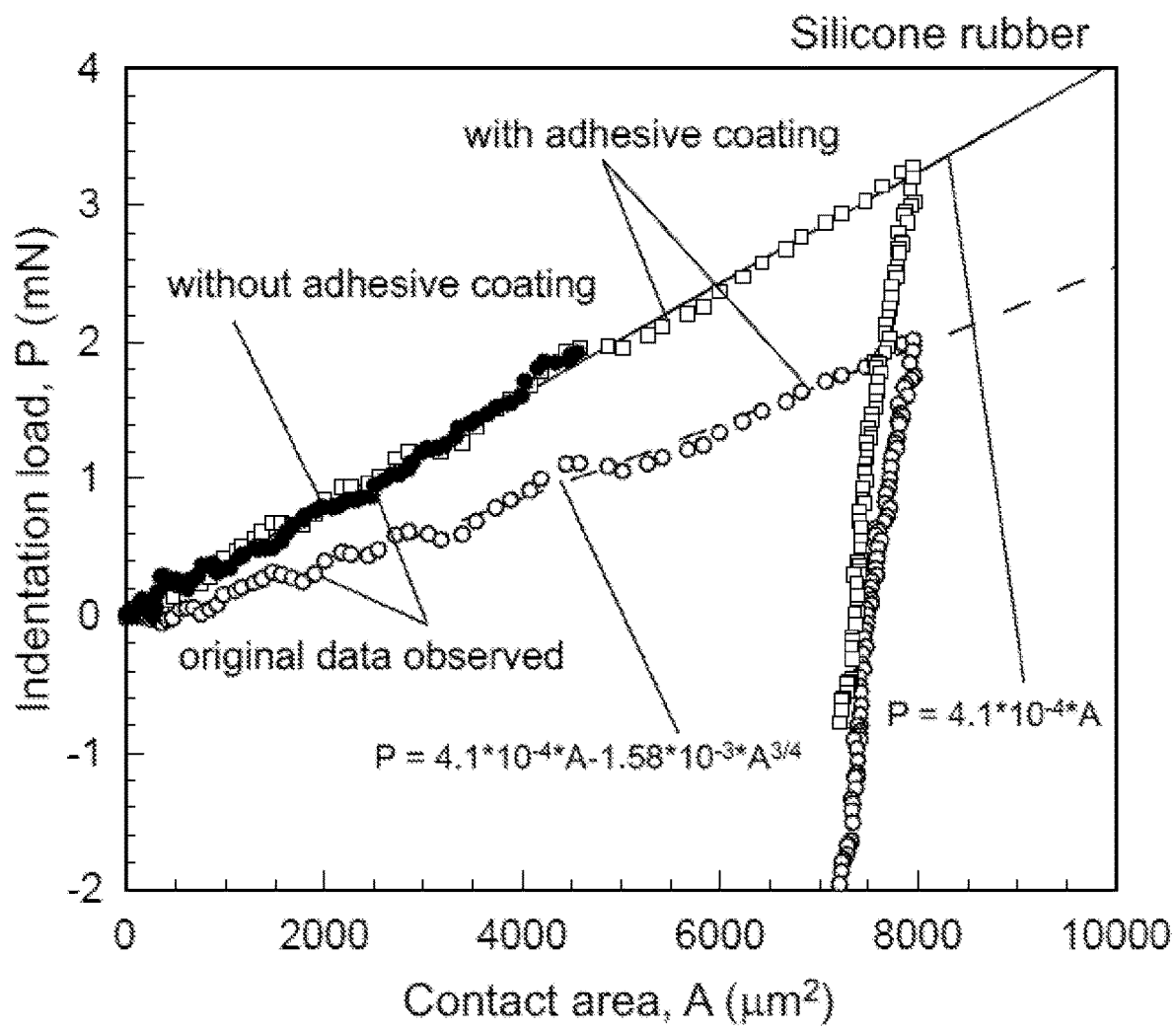
FIG. 10 is the P-A relations of a silicon rubber with and without glue coated on the surface (Berkovich indentation), indicating well the effect of surface adhesion on the P-A relation.

FIG. 10 shows the P-A loading/unloading relations measured on the indentation microscope; the solid circles ● indicate the test result of the silicone rubber without the glue coated, while the open circles ○ represents the test result of the glue-coated silicon rubber.

Formula (32) is applied to the test results shown in FIG. 10. In order to characterize the adhesion toughness $\lambda$, $P_{ah} = +\lambda A^{3/4}$ is "added" to the measured P-A data (the open circles; ○), resulting in the modified P-A relationship (the squares; □). The slope of this modified linear P-A relation, i.e. (E'/2)tan $\beta$, must be that of the P-A relation (the closed circles: ●) of the silicone rubber without adhesive coating, provided that the adhesion toughness $\lambda$ is correctly evaluated. Therefore, it is verified through these graphical procedures applied to the test results shown in FIG. 10 that the adhesion toughness $\lambda$ as well as the adhesion energy $\gamma$ can be successfully evaluated in experiments conducted on the instrumented indentation microscope.

Example 4

Aloe-gel was selected as an example of soft materials having an extremely low elastic modulus E'. Aloe leaves were sliced to make the test specimens with their thickness of about 3.5 mm. The translucent gel of the mesophyll was indented on the instrument indentation microscope.

Figure 11:
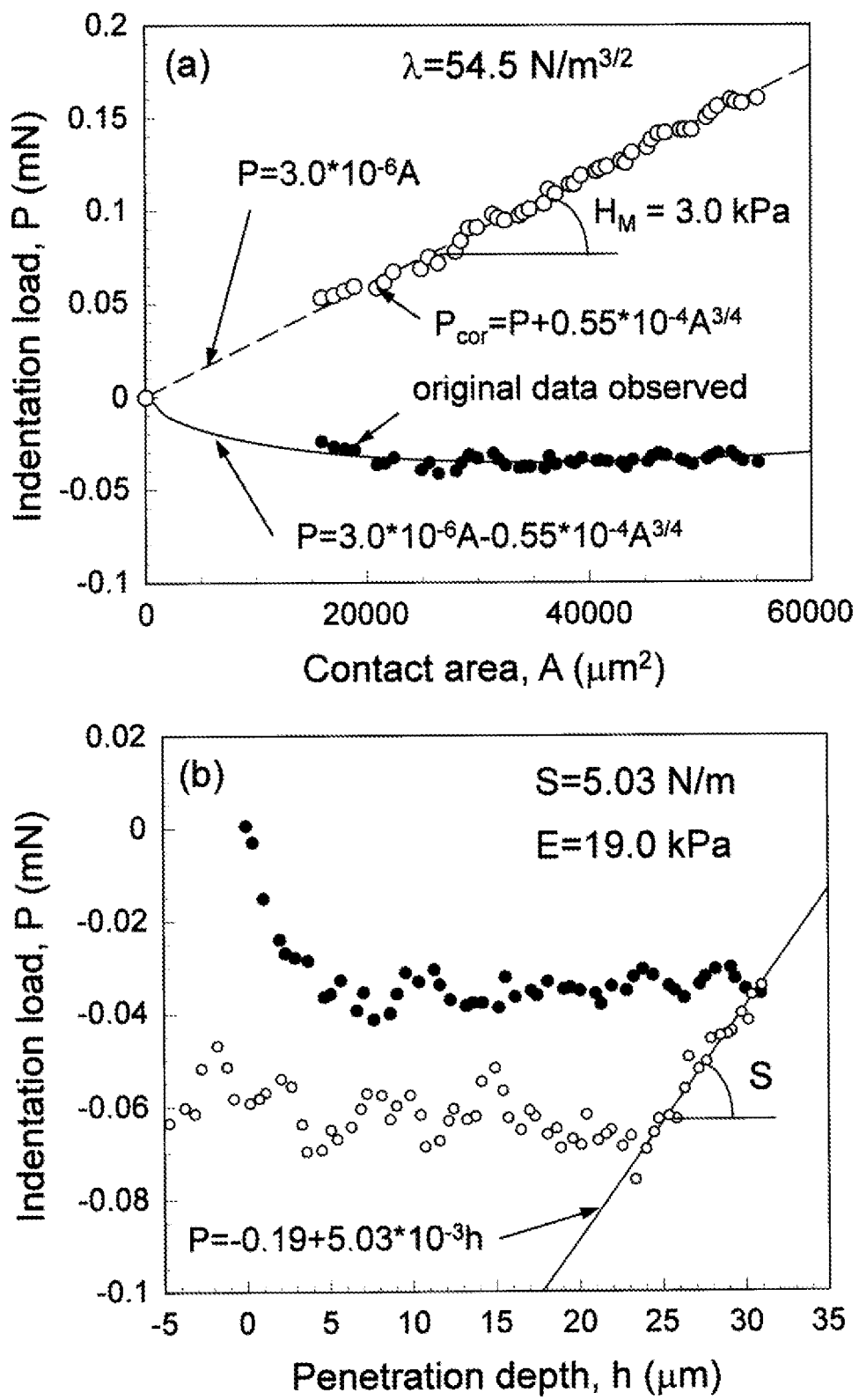
FIG. 11 illustrates the test results of aloe-gel to demonstrate the embodiment of the present invention (Berkovich indentation): (a) is the P-A relationships obtained on the instrumented indentation microscope (the closed symbols; ●), where the open symbols (○) indicates the JKR-corrected linear relationship after eliminating the effect of surface adhesion; (b) is the loading/unloading P-h hysteresis (Berkovich indentation) of aloe-gel.

FIG. 11(a) shows the P-A loading/unloading relations of the aloe-gel measured with a Berkovich indenter ($\beta=24.75°$). FIG. 11(b) demonstrates the P-A loading relations with and without surface adhesion, the detailed procedures of which are given in what follows.

Formulas (35) and (36) are applied to the loading P-A relation of aloe-gel shown in FIG. 11(a). The formula of $P_{ah} = +\lambda_{EP} A^{3/4}$ is "added" to the measured P-A data in FIG. 11(a) by assuming the appropriate $\lambda_{EP}$-value in trial and error until the P+$P_{ah}$ vs. A relationship is drawn as a straight line passing through the origin of the graph. The slope of this corrected straight line passing through the origin of the graph gives the Meyer hardness $H_M$. The $\lambda_{EP}$-value thus estimated is the elastoplastic adhesion toughness defined in Formula (36).

The Meyer hardness $H_M$ was determined to be 3.0 kPa from the slope of the straight line passing through the origin of the graph shown in FIG. 11(a) that is derived through estimating the appropriate $\lambda_{EP}$-value in a trial-and-error procedure.

The elastic modulus E' obtained from the unloading modulus M given as an initial slope of the unloading P-A line might be significantly overestimated due to the effect of surface adhesion. In order to circumvent this issue, E' must be determined using the unloading stiffness S given as the initial slope of the P-h unloading curve as shown in FIG. 11(b). In an axisymmetric indenter with arbitrary shape including the conventional Vickers/Berkovich indenters, the unloading initial process can be treated as "the unloading process of a flat-ended cylindrical punch pressed onto an elastic body". Accordingly, the elastic modulus E' is quantitatively related to the unloading stiffness S as follows;

[Equation 49]

$$E' = \frac{\sqrt{\pi}}{2\sqrt{A}} S \tag{49}$$

The elastic modulus E' of the aloe-gel was, therefore, successfully evaluated to be 19.0 kPa through applying the observed S-value in FIG. 11(b) to Formula (49).

The Meyer hardness ($H_M=3.0$ kPa) as an elastoplastic parameter, the elastic modulus (E'=19.0 kPa) as an elastic parameter, and the yield value Y as a plastic parameter are correlated through the following formula on the basis of the "principle of the excluded volume of indentation";

[Equation 50]

$$\frac{1}{(cY)^{3/2}} = \frac{1}{(H_M)^{3/2}} - \frac{1}{(E' \tan \beta / 2)^{3/2}} \tag{50}$$

Using Formula (50), therefore, the yield stress as the plastic measure of the aloe-gel was determined to be Y=1.94 kPa through assuming the constraint fact c=2.65.

The elastoplastic adhesion toughness $\lambda_{EP}$ thus obtained in the analysis made in FIG. 11(a) combined with

[Equation 51]

$$\lambda_{EP} = 4\sqrt{\gamma_{EP} E' / \pi^{1/2}} = 55 \text{ N/m}^{3/2} \tag{51}$$

finally leads to the adhesion energy (i.e. the surface energy or the force of surface tension) of the aloe-gel; $\gamma_{EP}=17.4$ mJ/m². It will be worthy of note that this $\gamma_{EP}$-value is less than the surface energy of pure water (73 mJ/m²).

Preferred embodiments of the present invention have been described in detail through the preceding context. The present invention, however, is not limited to the specific embodiments, and various modifications and alterations may be made within the scope of the present invention described in the appended claims.

The invention claimed is:
1. A test method for characterizing mechanical properties of a test specimen comprising
   A) providing the test specimen; and
   B) obtaining a surface adhesion energy $\gamma$ of the specimen on the basis of an experimentally derived P-A relationship,
   wherein P is an indentation load under a penetration depth h of an indenter pressed onto a test specimen with surface adhesion, and
   wherein A is a contact area of indentation at a contact radius a under an applied load of P, wherein the P-A relationship is represented by the following Formula (32), Formula (35), Formula (36), and/or Formula (44), wherein the P-A relationship of elastic body for pyramid/cone indentation is represented by the following Formula (32):

$$P = \left(\frac{E'}{2}\tan\beta\right)\pi a^2 - 4\sqrt{\pi\gamma E'}\, a^{3/2} \quad (32)$$
$$= \left(\frac{E'}{2}\tan\beta\right)A - 4\sqrt{\frac{\gamma E'}{\pi^{1/2}}}\, A^{3/4}$$

wherein, in Formula (32), E' is an elastic modulus, and β is the inclined face-angle of indenter, wherein the P-A relationship of elastoplastic body for pyramid/cone indentation is given by the following Formula (35), Formula (36), and Formula (44):

$$P = H_M A - \lambda_{EP} A^{3/4} \quad (35)$$

wherein, in Formula (35), $H_M$ is the Meyer hardness, and $\lambda_{EP}$ stands for the elastoplastic adhesion toughness given by $$\lambda_{EP} = 4\sqrt{\frac{\gamma_{EP} E'}{\pi^{1/2}}} \quad (36)$$

wherein, in Formula (36), $\gamma_{EP}$ is elastoplastic adhesion energy, wherein, the P-A relationship of viscoelastic body for conical indentation under the stepwise penetration to the fixed contact area of $A_0$ is represented by Formula (44):

$$P(t) = \left(\frac{\tan\beta}{2}A_0\right)E'_{relax}(t) - 4\sqrt{\frac{\gamma}{\pi^{1/2}}}\, A_0^{3/4}\sqrt{E'_{relax}(t)} \quad (44)$$

wherein, in Formula (44), $E'_{relax}(t)$ is the relaxation modulus.

2. The test method according to claim 1, wherein the test specimen is one of an elastic, elastoplastic or a viscoelastic body.

* * * * *